United States Patent
Yu et al.

[11] Patent Number: 5,921,604
[45] Date of Patent: Jul. 13, 1999

[54] HYDRAULIC DOOR OPERATING SYSTEM

[75] Inventors: Xudong Yu, Brookfield; Eric N. Griesbach, North Prairie; Douglas C. Blotz, Waukesha, all of Wis.

[73] Assignee: Applied Power Inc., Butler, Wis.

[21] Appl. No.: 08/856,715

[22] Filed: May 15, 1997

Related U.S. Application Data

[60] Provisional application No. 60/017,734, May 16, 1996.

[51] Int. Cl.⁶ .................................................. B62D 25/00
[52] U.S. Cl. ..................... 296/56; 296/146.4; 296/146.8
[58] Field of Search .............................. 296/146.4, 146.8, 296/56; 49/324, 737, 139, 501; 60/476, 475, 478, 414; 92/110, 134

[56] References Cited

U.S. PATENT DOCUMENTS

| | | | |
|---|---|---|---|
| 2,657,533 | 11/1953 | Schanzlin et al. | 60/478 |
| 2,990,816 | 7/1961 | Vincent | 92/134 |
| 3,205,659 | 9/1965 | Hartzell | 60/414 |
| 3,306,655 | 2/1967 | Voehringer | 296/57 |
| 3,869,168 | 3/1975 | Matheson | 296/56 |
| 3,891,126 | 6/1975 | Segawa | 92/134 |
| 4,414,808 | 11/1983 | Benson | 60/414 |
| 4,646,849 | 3/1987 | Watvedt | 92/110 |
| 4,880,267 | 11/1989 | Ohya | 296/146.8 |
| 5,147,106 | 9/1992 | Bartell et al. | 296/56 |
| 5,228,239 | 7/1993 | Heo | 49/280 |
| 5,531,498 | 7/1996 | Kowall | 296/56 |
| 5,536,150 | 7/1996 | Tucker | 60/476 |

FOREIGN PATENT DOCUMENTS

| | | | |
|---|---|---|---|
| 3942-309 | 6/1991 | Germany | 296/146.4 |
| 402014980 | 1/1990 | Japan | 296/146.4 |

*Primary Examiner*—Joseph D. Pape
*Assistant Examiner*—Kiran B. Patel
*Attorney, Agent, or Firm*—Quarles & Brady

[57] ABSTRACT

A hydraulic system for opening and/or closing the rear lift gate of a vehicle uses a double or single acting gas charged hydraulic cylinder. If double acting, a second piston separates the head side of the cylinder into hydraulic and gas chambers. A unidirectional (for the single acting cylinder) or a bidirectional (for the double acting cylinder) drives a pump to operate the cylinder. A solenoid actuated on-off valve selectively communicates the ports of the cylinder with tank pressure. A gas charge accumulator may also be provided. In the double acting embodiment, a two way ball shuttle valve which is vented in the center provides alternating communication between the two cylinder ports.

11 Claims, 5 Drawing Sheets

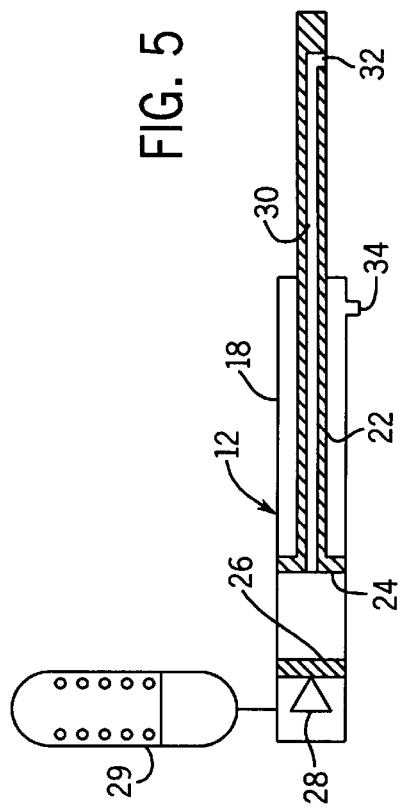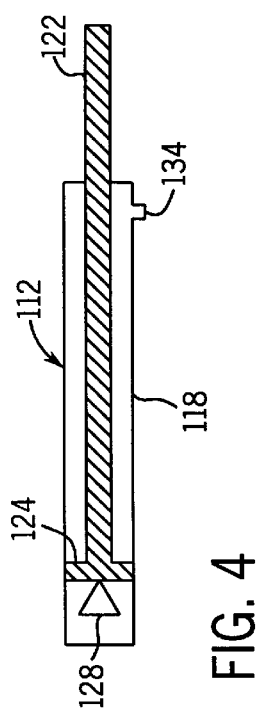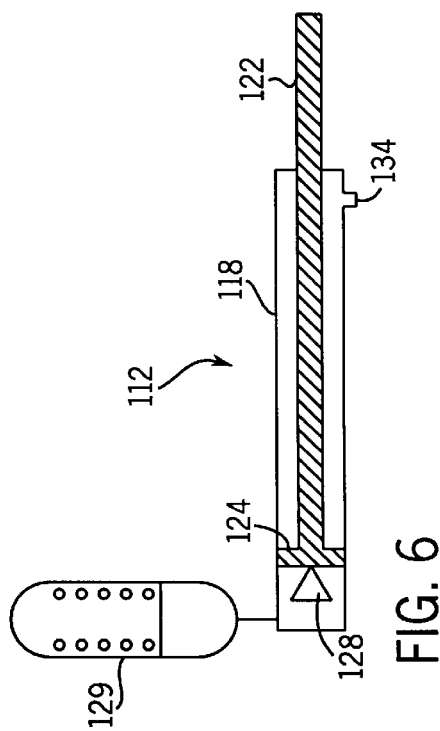

HYDRAULIC DOOR OPERATING SYSTEM

This application claims the benefit of U.S. Provisional Patent Application No. 60/017,734 filed May 16, 1996.

BACKGROUND OF THE INVENTION

1. Field of the Invention

This invention relates to a hydraulic door operating system which may be either manually or automatically operated and in particular to such a system which is specially adapted for the liftgate of a minivan or sport utility vehicle.

2. Discussion of the Prior Art

The liftgate of a minivan or sport utility vehicle that is hinged about a horizontal axis at the top of the gate usually has gas charged cylinders at each side of the gate which provide an opening force and help hold the gate open after it is in its fully open position. These gates are usually manually operated by unlatching the gate and lifting it and manually closing it. Usually, at some angle of the gate between fully open and fully closed, the force provided by the gas charged cylinders equals the force of gravity tending to close the gate.

As an enhancement, it is desirable to provide such gates with an automatic system for opening and closing them. Ideally, such a system should be transparent to the user when manually opening and closing the gate. In other words, to manually open and close the liftgate of a system to which the invention has been applied, the user should not have to deviate from the usual opening and closing procedure employed with non-automatic, conventional liftgates. The user should just be able to walk up to the gate (after it is unlatched), lift the gate as usual, and close the gate as usual, overriding the automatic operation of the gate.

SUMMARY OF THE INVENTION

The invention provides an improvement in a hydraulic door operating system of the type having a linear hydraulic actuator for opening or closing a door. The improvement provided by the invention is that the head side of the chamber is charged with a gas under super-atmospheric pressure which biases the rod to an extended position. Thus, hydraulic pressure can be applied to retract the rod, thereby closing the door, when the operating system is actuated. If manual operation is desired, the user can simply override the system by manually closing the liftgate.

An operating system of the invention may be made to both open and close a liftgate, with manual override in both directions. In a preferred aspect, this is accomplished by making the pump bidirectional and the cylinder double acting with rod side and head ports. The circuit is operated to pressurize or vent the ports, with one vented to tank pressure when the other is pressurized, depending upon which direction the pump is driven.

In a preferred aspect, a system of the invention has a second piston in said chamber on said head side. The second piston divides the head side chamber into a hydraulic chamber on the side of the second piston of the rod piston and a gas chamber on the opposite side of the second piston. Driving the pump in one direction pressurizes one of the two side of the rod piston and driving the pump in the other direction pressurizes the other port. Thus, power opening and closing of the gate is provided, plus a gas assist for manually opening, holding open and manually closing the gate.

In other useful aspect of the invention, the pump communicates with the hydraulic chamber by a passageway which extends through the rod, which eliminates hydraulic lines, an accumulator for providing a higher volume gas charge may be provided, and the cylinder may be mounted with its rod end down so as to conceal the accumulator behind a body panel of the vehicle.

These and other objects and advantages of the invention will be apparent from the detailed description and drawings.

BRIEF DESCRIPTION OF THE DRAWINGS

FIG. 4 illustrates a schematic detail view of a cylinder for use with the system of FIG. 3;

FIG. 5 illustrates an alternate embodiment of a cylinder for use with the system of FIG. 1;

FIG. 6 illustrates an alternate embodiment of a cylinder for use with the system of FIG. 3;

DETAILED DESCRIPTION OF THE PREFERRED EMBODIMENTS

Figure 1:
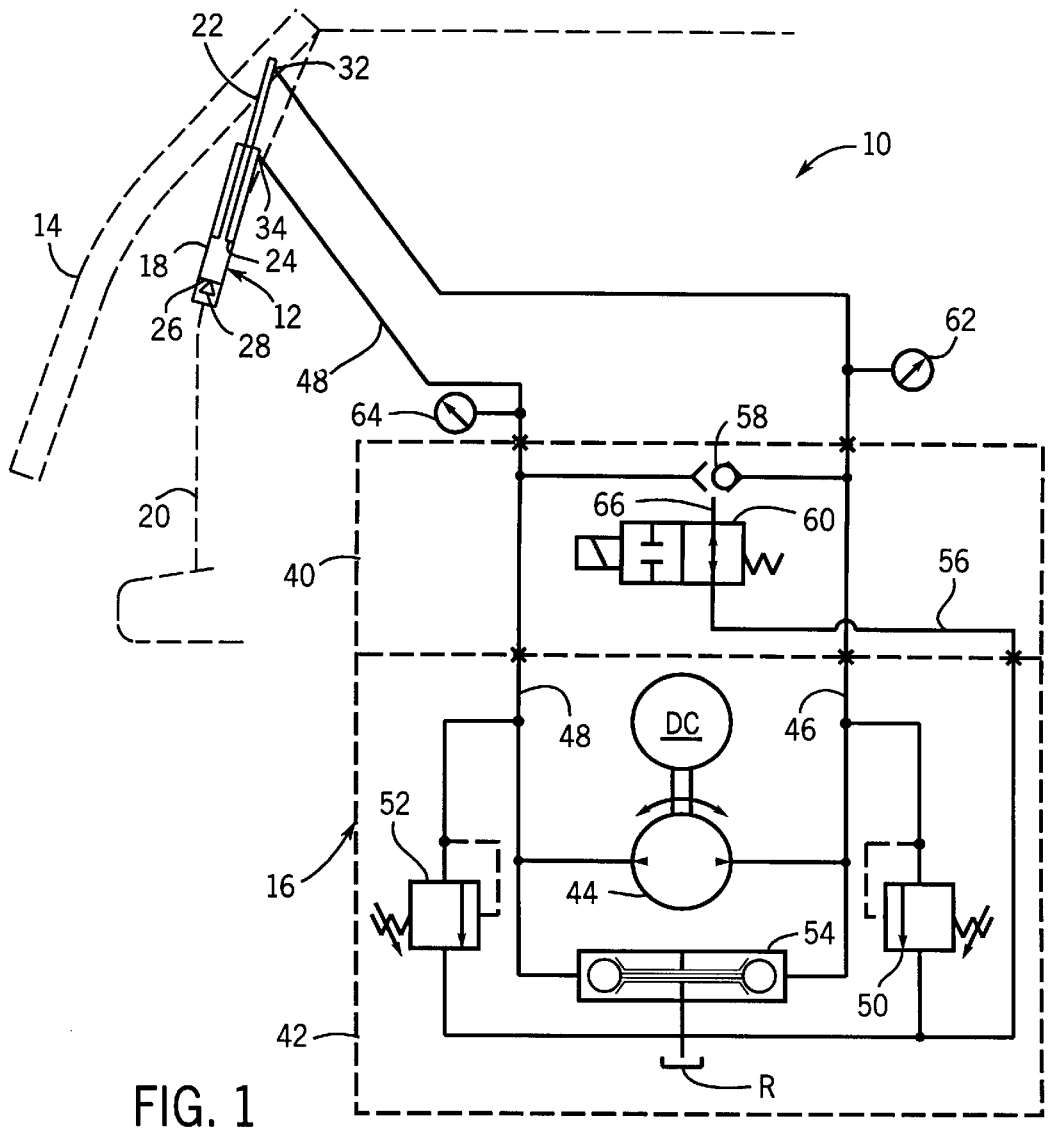
FIG. 1 illustrates a hydraulic opening and closing system of the invention applied to the liftgate of a minivan type vehicle, illustrated in phantom.
Figure 2:
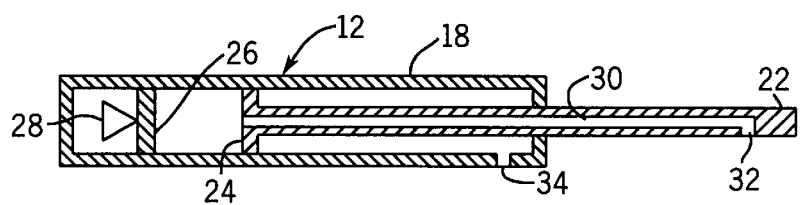
FIG. 2 illustrates a detail schematic view of one of the cylinders used in FIG. 1.

FIG. 1 illustrates a system 10 of the invention which incorporates a pair of gas charged double acting hydraulic actuators 12 (shown in more detail in FIG. 2), one at each side of the Door/liftgate 14, which is hinged to rotate about a horizontal axis at the upper rear corner of a wheeled land vehicle such as a minivan or sport utility vehicle. Only one of the actuators 12 is shown in FIG. 1, it being understood that the cylinder 12 on the other (far) side of the liftgate 14 would be connected to the hydraulic circuit 16 in the same manner as the cylinder 12 shown in FIG. 1.

Hydraulic actuator 12 has cylinder 18 connected at its free or head end to chassis 20 and rod 22 connected at its free end to gate 14. Both connections at the ends of the actuator 12 are pivotal connections, as is well-known in mounting conventional gas-charged cylinders for vehicle liftgates. Rod 22 extends into the chamber defined by cylinder 18 and terminates in rod piston 24, there being a sliding seal between the piston 24 and the cylinder 18. There is also a sliding seal between the rod 22 and the rod end of cylinder 18. A second piston 26 is acted on by a nitrogen gas charge, represented by arrow head 28, on its side opposite from piston 24 and also establishes a sliding seal with cylinder 18. A passageway 30 is formed in rod 22 from head side port 32 to the chamber between pistons 24 and 26 within the cylinder 18, and a rod side port 34 is formed in the cylinder 18 which opens into the cylinder 18 on the rod side of the piston 24.

The actuator 12 is hydraulically connected to hydraulic circuit 16. Hydraulic circuit 16 is made up of a valve module 40 and a pump package 42. Included in the pump package 42 is a bidirectional external gear pump 44 which is powered by the electrical system of the vehicle to which the system 10 is applied. The pump 44 may be operated in either direction to provide hydraulic fluid under pressure to line 46 if operated in one direction or to line 48 if operated in the other direction.

Pressure relief valves 50 and 52 are connected to the respective lines 46 and 48, which relieve the pressure therein if it exceeds a certain pressure limit which is above the normal operating limits for the system. Lines 46 and 48 are also each connected to opposite ends of a double ball shuttle valve 54. The two way shuttle valve 54 is essentially two ball valves with a pusher rod extending between them so that closing one of the ball valves opens the other ball valve. Between the ball valves, the shuttle valve 54 is vented to the reservoir R, and the relief valves 50 and 52 are also vented to the reservoir R.

Lines 46 and 48 extend into the valve module 40 as does a relief line 56 which is connected to the reservoir R. A single ball shuttle-type check valve 58 connects the lines 46 and 48 in the valve module 40 and has the chamber between its two seats connected to a two-way, two-position solenoid-operated on-off valve 60, which is turned on when the pump 44 is turned on. The valve 60 is also connected to the relief line 56 as illustrated. Also as illustrated, the line 46 is connected to port 32 of the actuator 18 and the line 48 is connected to port 34. Pressure gauges 62 and 64 may optionally be provided.

In operation of the system of FIG. 1, when it is desired to lift the tailgate 14, after it is unlatched, motor 44 is operated so as to pressurize line 46, and valve 60 is turned on, so as to shift and block line 66 from communication with relief line 56. Pressurizing line 46 shifts shuttle valve 54 so as to close off communication between line 46 and the reservoir R and to open communication between the line 48 and the reservoir R. Pressurizing line 46 also shifts ball 58 so as to close communication of line 48 with line 66 and open communication of line 46 with line 66. Accordingly, hydraulic fluid flows from line 46 through port 32 and passageway 30 into the chamber between the pistons 24 and 26 so that rod 22 is extended, thereby lifting gate 14. As so operated, fluid on the rod side of piston 24 is able to flow out port 34 to line 48 and to the reservoir R. After reaching the top of the stroke of the swinging of the liftgate 14, if power to the system 10 is turned off, the nitrogen gas charge 28 maintains the liftgate 14 in the open position, with the piston 26 against the piston 24 since turning off the system 10 permits fluid in the cylinder 18 between the pistons 26 and 24 to flow to the reservoir R. This is accomplished since turning off the valve 60 returns it to the position shown in FIG. 1 in which line 66 is connected to line 56, which permits fluid from line 46 to flow to the reservoir R.

With the system off, if it is desired to manually close the gate 14, it is only necessary to manually rotate the gate 14 to the closed position, thereby further compressing the gas charge 28. In other words, the hydraulic circuit 16 would not interfere with manual closing or opening of the liftgate 14, since when the motor 44 and valve 16 are off, both sides of the piston 24 are open to the reservoir R.

For automatic closing of the gate 14, the motor 44 is operated so as to pressurize the line 48 and the valve 60 is energized so as to close off communication between line 66 and line 56. Pressurizing line 48 closes communication between line 48 and the reservoir R and opens communication between line 46 and the reservoir R through the valve 54. Pressurizing line 48 also shifts valve 58 so as to open communication between line 48 and line 66 and close communication between line 46 and line 66. Accordingly, fluid under pressure in line 48 flows through port 34 to retract rod 22, thereby closing gate 14. When fully closed, a power-operated latch can be provided to latch the gate 14, the power-operated latch forming no part of the present invention. Manual opening of the gate 14 is also permitted, since both lines 48 and 46 are opened to the reservoir R when the circuit 16 is turned off. In addition, manual opening would be assisted by the gas charge 28, similar to the assist provided in conventional strictly manual systems.

Figure 3:
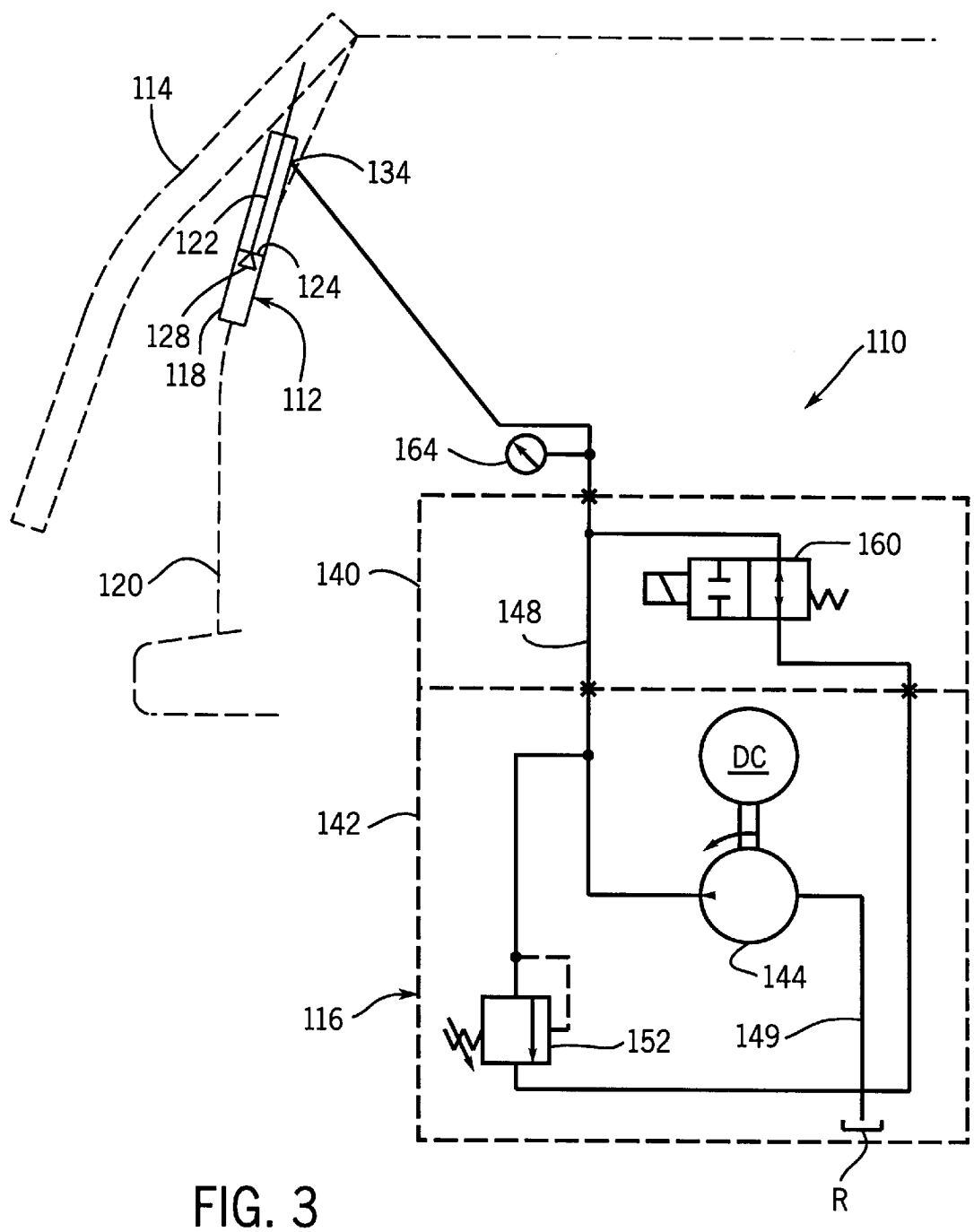
FIG. 3 illustrates an alternate embodiment of a hydraulic opening and closing system of the invention.

FIG. 3 illustrates an alternate embodiment of the invention which incorporates a pair of gas-charged single-acting hydraulic cylinders 112, one on each side of the gate 14 (only the near one of which is shown in FIG. 3). Both cylinders 112 are plumbed to the circuit 110 as shown for the one cylinder 112 illustrated in FIG. 3. For corresponding elements, the same references signs are applied to the embodiment shown in FIGS. 3 and 4 as in FIG. 1, plus 100.

As shown in FIGS. 3 and 4, the actuator 112 is gas-charged as shown at 128 but only has a single rod side port 134 and only a single piston 124. The motor 144 may be unidirectional. If unidirectional, the gas charge 128 would be relied upon for automatic opening of the gate 114 if automatic opening was desired, or the gas charge 128 may simply be relied upon for opening assist as in conventional units, it not providing a sufficient force by itself to open the gate from the fully closed position. However, automatic closing would be provided by operating pump 144 and energizing valve 160 so as to pressurize line 148, thereby injecting fluid under pressure on the rod side of piston 124.

It is also noted that motor 144 may be made a bidirectional motor. If made a bidirectional motor so as to pump fluid from line 148 to line 149, a partial vacuum could be created on the rod side of piston 124 to assist gas charge 128 in automatic opening of the gate 114. Making pump 144 bidirectional as an option is shown in FIG. 3 by the three dots in the pump 144 pointing to line 149.

Figure 7:
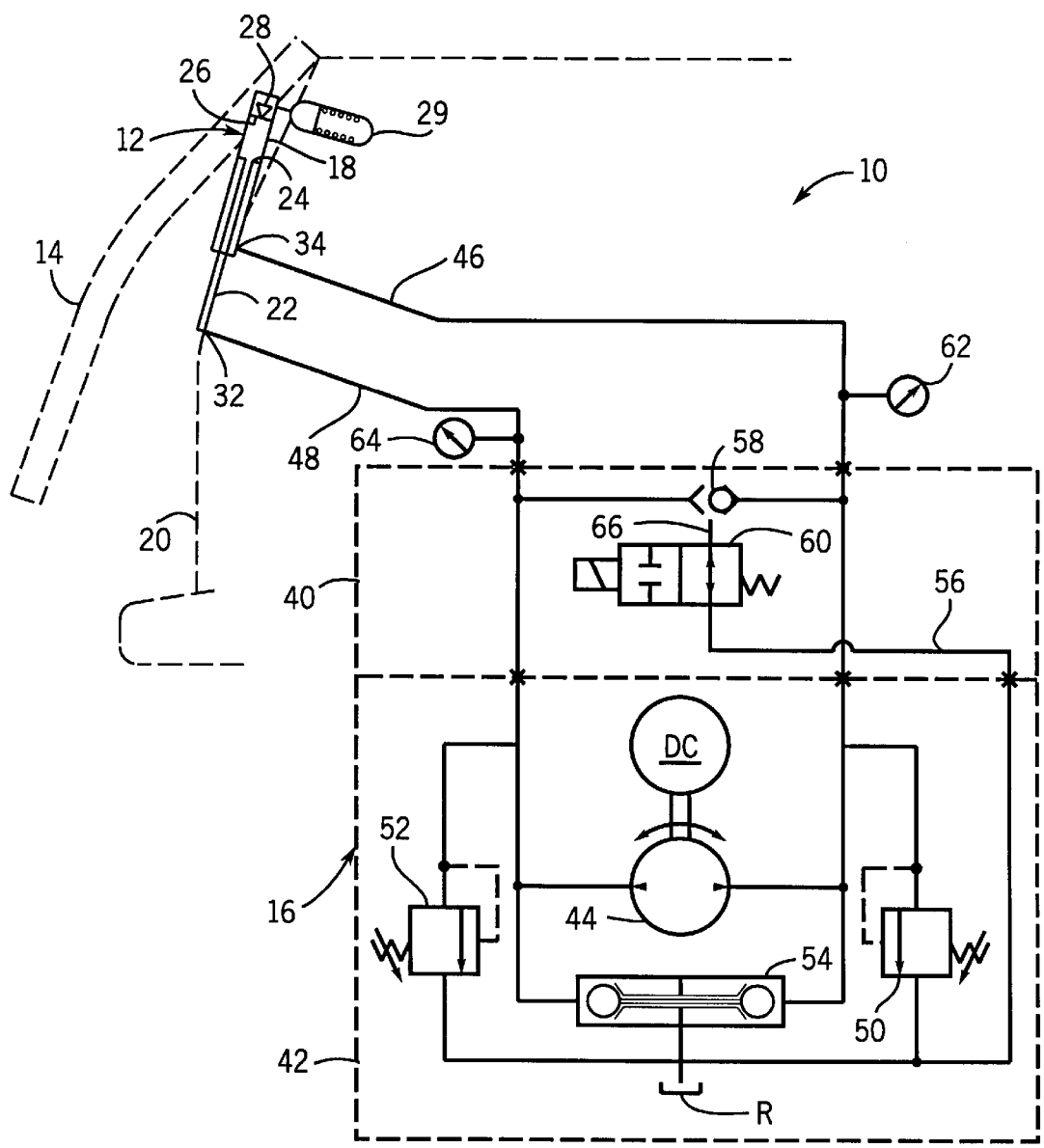
FIG. 7 illustrates the hydraulic circuit of FIG. 1 incorporated in a system of the invention with the cylinder of FIG. 5.
Figure 8:
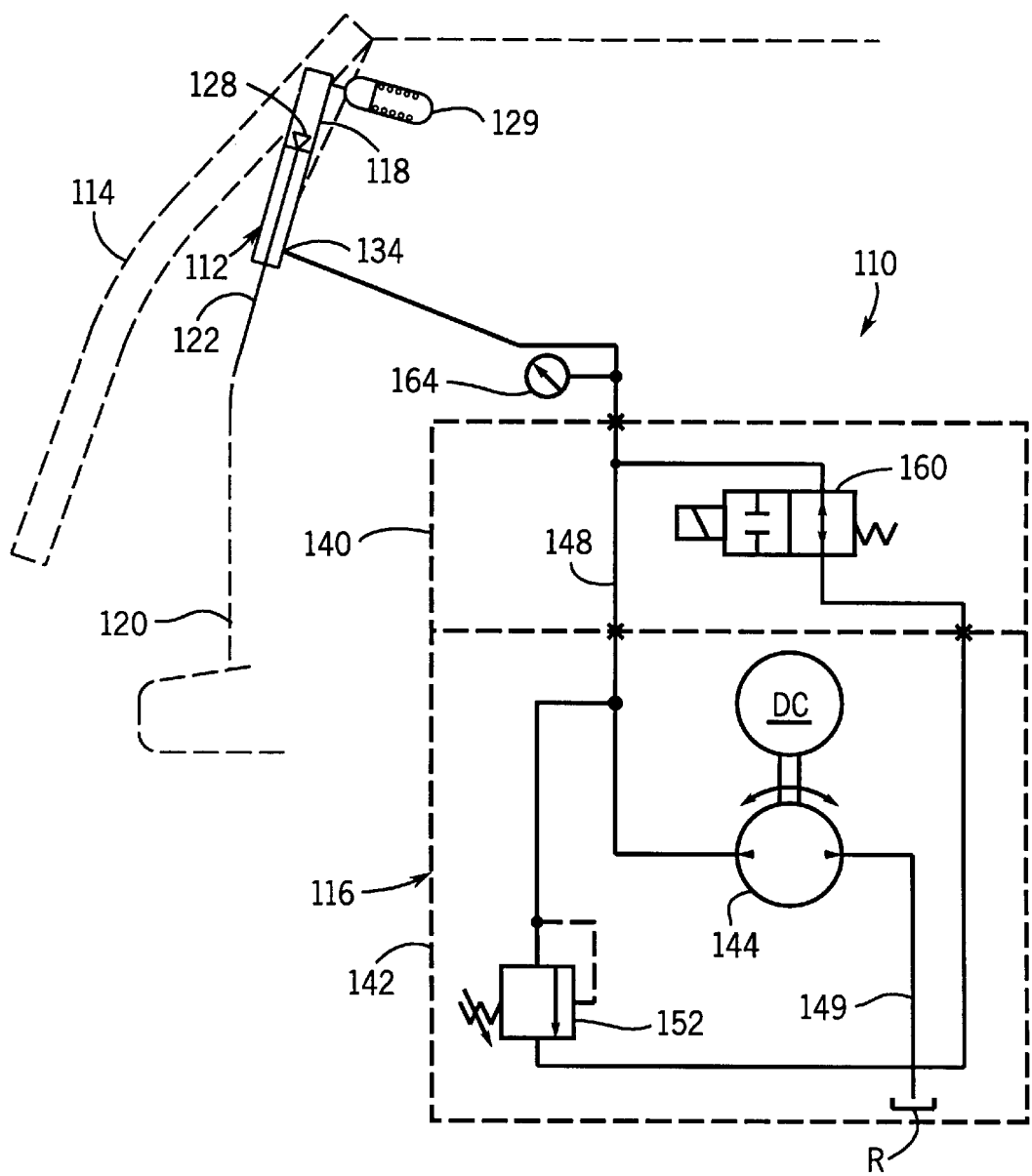
FIG. 8 illustrates a hydraulic circuit similar to the hydraulic circuit of FIG. 3 incorporated in a system of the invention with the cylinder of FIG. 6.

FIGS. 5 and 6 illustrate alternate actuators 12 and 112, respectively, which are provided with an external gas charge accumulator 29 or 129 in communication with the respective gas charge 28 or 128, so as to supplement the volume of it. The accumulators 29 and 129 are provided so as to permit a higher volume of gas under pressure acting to assist opening and closing and to hold the gate 114 open. FIGS. 7 and 8 illustrate the actuators 12 with the accumulator 29 and the actuator 112 with the accumulator 129, respectively, incorporated with the respective hydraulic circuits 16, 116. In both FIGS. 7 and 8, the actuator 12, 112 is inverted from its orientation shown in FIGS. 1 and 3, so that the accumulator 29, 129 can be hidden in a space inside the vehicle body 20. It is noted that the lines 46, 48 are switched relative to the ports 32 and 34, which is permissible. Also, in FIG. 8, the motor 144 is shown as bidirectional.

We claim:

1. In a hydraulic door operating system having a linear hydraulic actuator for opening or closing a door, said actuator having a cylinder defining a chamber with a rod piston within said chamber and a rod extending from said rod piston out a rod side end of said cylinder, said rod piston dividing said chamber into a rod side on the side of said rod piston from which the rod extends and a head side opposite from said rod side, and said actuator having a rod side port opening into said rod side of said chamber, a hydraulic pump for supplying hydraulic fluid under pressure and means for communicating said hydraulic fluid from said pump to said rod side port, the improvement wherein said head side of said chamber is charged with a gas under super-atmospheric pressure which biases said rod to an extended position.

2. The improvement of claim 1, wherein said system is operable to close said door.

3. The improvement of claim 1, wherein said pump is bidirectional.

4. The improvement of claim 3, wherein said actuator has a second piston in said chamber on said head side dividing said head side chamber into a hydraulic chamber between said second piston and said rod piston and a gas chamber on a side of said second piston which is opposite from said hydraulic chamber; said cylinder has a second port in communication with said hydraulic chamber; and said system has means for communicating said pump with said second port such that driving said pump in one direction pressurizes one of said ports and driving said pump in said other direction pressurizes the other of said ports.

5. The improvement of claim 4, further comprising a two-way shuttle valve with a center tank pressure port in fluid communication with both of said cylinder ports such that pressurizing one of said cylinder ports vents the other cylinder port to tank pressure.

6. The improvement of claim 5, further comprising an on-off valve for selectively communicating at least one of said cylinder ports with tank pressure.

7. The improvement of claim 4, wherein said second port is in communication with said hydraulic chamber by a passageway which extends through said rod.

8. The improvement of claim 1 further comprising a wheeled land vehicle having a rear gate hinged to rotate about a horizontal axis adjacent an upper rear corner of said vehicle.

9. The improvement of claim 8, wherein said cylinder has a head end opposite from said rod end which is secured to said gate.

10. The improvement of claim 1, further comprising a gas pressure accumulator in communication with said gas under super-atmospheric pressure on said head side of said chamber.

11. The improvement of claim 1, further comprising a motor devoted solely to driving said pump and an electrically actuated on-off valve for selectively communicating said rod side port with a tank pressure.

* * * * *